(12) United States Patent  
Sequeira, Jr. et al.

(10) Patent No.: US 9,026,417 B2  
(45) Date of Patent: May 5, 2015

(54) ITERATIVE RESERVOIR SURVEILLANCE

(75) Inventors: Jose J. Sequeira, Jr., The Woodlands, TX (US); Yao-Chou Cheng, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 681 days.

(21) Appl. No.: 12/738,948

(22) PCT Filed: Oct. 20, 2008

(86) PCT No.: PCT/US2008/080513  
§ 371 (c)(1),  
(2), (4) Date: Apr. 20, 2010

(87) PCT Pub. No.: WO2009/075946  
PCT Pub. Date: Jun. 18, 2009

(65) Prior Publication Data  
US 2010/0206559 A1    Aug. 19, 2010

Related U.S. Application Data

(60) Provisional application No. 61/007,554, filed on Dec. 13, 2007.

(51) Int. Cl.  
G06G 7/48    (2006.01)  
G01V 99/00    (2009.01)  
E21B 41/00    (2006.01)

(52) U.S. Cl.  
CPC ............... *G01V 99/00* (2013.01); *E21B 41/00* (2013.01)

(58) Field of Classification Search  
CPC ................................ G01V 99/00; E21B 41/00  
USPC ............................................................ 703/10  
See application file for complete search history.

(56) References Cited

U.S. PATENT DOCUMENTS 5,468,088 A    11/1995    Shoemaker et al.  
5,708,764 A    1/1998    Borrel et al.  
(Continued)

FOREIGN PATENT DOCUMENTS

| | | |
|---|---|---|
| CA | 2312381 | 6/1999 |
| EP | 1036341 | 11/1998 |
| GB | 2448622 | 10/2008 |
| WO | 00/14574 | 3/2000 |
| WO | WO 01/62603 | 8/2001 |
| WO | 03/003053 | 10/2003 |

OTHER PUBLICATIONS

John R. Fanchi, "Shared Earth Modeling," 2002, Gulf Professional Publishing, pp. 1-16, 62, 172-173, 179, 182, 190-192, 201, 245-258, 264-266, 270.*

(Continued)

*Primary Examiner* — Kamini S Shah  
*Assistant Examiner* — Russ Guill  
(74) *Attorney, Agent, or Firm* — ExxonMobil Upstream Research Company Law Dept.

(57) ABSTRACT

Method for reservoir surveillance using a three-dimensional Earth Model (101) to improve and expedite the surveillance at all scales of investigation (field, reservoir, fault compartment, and individual well) and at all time steps (minutes, hours, days, months, years). The new method allows users to rapidly identify anomalous field and well performance (109) and provides capability to investigate root causes of the performance deviation from predicted (110). Animated co-rendered displays (107) of the earth model and actual (104) and simulated (105) production data enable the user to interactively determine model adjustments back at the basic level of the Earth Model, which are then propagated to a geologic model (102) and then to the reservoir simulator (103) to update it (111) in a physically constrained way.

16 Claims, 6 Drawing Sheets

(56) References Cited

U.S. PATENT DOCUMENTS

| | | |
|---|---|---|
| 5,992,519 A | 11/1999 | Ramakrishnan et al. |
| 6,035,255 A | 3/2000 | Murphy et al. |
| 6,044,328 A | 3/2000 | Murphy et al. |
| 6,070,125 A | 5/2000 | Murphy et al. |
| 6,219,061 B1 | 4/2001 | Lauer et al. |
| 6,236,994 B1 | 5/2001 | Swartz et al. |
| 6,353,677 B1 | 3/2002 | Pfister et al. |
| 6,373,489 B1 | 4/2002 | Lu et al. |
| 6,516,274 B2 | 2/2003 | Cheng et al. |
| 6,519,568 B1 | 2/2003 | Harvey et al. |
| 6,549,879 B1 | 4/2003 | Cullick et al. |
| 6,643,656 B2 | 11/2003 | Peterson |
| 6,757,613 B2 | 6/2004 | Chapman et al. |
| 6,765,570 B1 | 7/2004 | Cheung et al. |
| 6,766,254 B1 | 7/2004 | Bradford et al. |
| 6,772,066 B2 | 8/2004 | Cook |
| 6,823,266 B2 | 11/2004 | Czernuszenko et al. |
| 6,823,732 B2 | 11/2004 | Corghi |
| 6,826,483 B1 * | 11/2004 | Anderson et al. ............ 702/13 |
| 6,829,570 B1 | 12/2004 | Thambynayagam et al. |
| 6,912,467 B2 | 6/2005 | Schuette |
| 6,912,468 B2 | 6/2005 | Marin et al. |
| 6,980,939 B2 | 12/2005 | Dhir et al. |
| 6,980,940 B1 | 12/2005 | Gurpinar et al. |
| 6,993,434 B2 | 1/2006 | Cheng et al. |
| 7,003,439 B2 | 2/2006 | Aldred et al. |
| 7,027,925 B2 | 4/2006 | Terentyev et al. |
| 7,031,842 B1 | 4/2006 | Musat et al. |
| 7,050,953 B2 | 5/2006 | Chiang et al. |
| 7,079,953 B2 | 7/2006 | Thorne et al. |
| 7,096,172 B2 | 8/2006 | Colvin et al. |
| 7,098,908 B2 | 8/2006 | Acosta et al. |
| 7,136,064 B2 | 11/2006 | Zuiderveld |
| 7,181,380 B2 | 2/2007 | Dusterhoft et al. |
| 7,203,342 B2 | 4/2007 | Pedersen |
| 7,248,258 B2 | 7/2007 | Acosta et al. |
| 7,280,932 B2 | 10/2007 | Zoraster et al. |
| 7,281,213 B2 | 10/2007 | Callegari |
| 7,283,941 B2 | 10/2007 | Horowitz et al. |
| 7,298,376 B2 | 11/2007 | Chuter |
| 7,314,588 B2 | 1/2008 | Blankenship |
| 7,330,791 B2 | 2/2008 | Kim et al. |
| 7,337,067 B2 | 2/2008 | Sanstrom |
| 7,362,329 B2 | 4/2008 | Zuiderveld |
| 7,363,866 B2 | 4/2008 | Gnedenko et al. |
| 7,366,616 B2 | 4/2008 | Bennett et al. |
| 7,395,252 B2 | 7/2008 | Anderson et al. |
| 7,409,438 B2 | 8/2008 | McConnell et al. |
| 7,412,363 B2 | 8/2008 | Callegari |
| 7,437,358 B2 | 10/2008 | Arrouye et al. |
| 7,451,066 B2 | 11/2008 | Edwards et al. |
| 7,460,957 B2 | 12/2008 | Prange et al. |
| 7,478,024 B2 | 1/2009 | Gurpinar et al. |
| 7,512,543 B2 | 3/2009 | Raghuraman et al. |
| 7,539,625 B2 | 5/2009 | Klumpen et al. |
| 7,548,873 B2 | 6/2009 | Veeningen et al. |
| 7,565,243 B2 | 7/2009 | Kim et al. |
| 7,576,740 B2 | 8/2009 | Dicken |
| 7,596,481 B2 | 9/2009 | Zamora et al. |
| 7,603,264 B2 | 10/2009 | Zamora et al. |
| 7,606,666 B2 | 10/2009 | Repin et al. |
| 7,616,213 B2 | 11/2009 | Chuter |
| 7,620,534 B2 | 11/2009 | Pita et al. |
| 7,627,430 B2 | 12/2009 | Hawtin |
| 7,630,914 B2 | 12/2009 | Veeningen et al. |
| 7,657,407 B2 | 2/2010 | Logan |
| 7,657,414 B2 | 2/2010 | Zamora et al. |
| 7,668,700 B2 | 2/2010 | Erignac et al. |
| 7,684,929 B2 | 3/2010 | Prange et al. |
| 7,716,028 B2 | 5/2010 | Montaron et al. |
| 7,725,302 B2 | 5/2010 | Ayan et al. |
| 7,739,089 B2 | 6/2010 | Gurpinar et al. |
| 7,743,006 B2 | 6/2010 | Woronow et al. |
| 7,796,468 B2 | 9/2010 | Kellogg |
| 7,814,989 B2 | 10/2010 | Nikolakis-Mouchas et al. |
| 7,876,705 B2 | 1/2011 | Gurpinar et al. |
| 7,913,190 B2 | 3/2011 | Grimaud et al. |
| 7,925,483 B2 | 4/2011 | Xia et al. |
| 7,925,695 B2 | 4/2011 | McConnell et al. |
| 7,953,585 B2 | 5/2011 | Gurpinar et al. |
| 7,953,587 B2 | 5/2011 | Bratton et al. |
| 7,970,545 B2 | 6/2011 | Sanstrom |
| 7,986,319 B2 | 7/2011 | Dommisse et al. |
| 7,991,600 B2 | 8/2011 | Callegari |
| 7,995,057 B2 | 8/2011 | Chuter |
| 8,005,658 B2 | 8/2011 | Tilke et al. |
| 8,055,026 B2 | 11/2011 | Pedersen |
| 8,064,684 B2 | 11/2011 | Ratti et al. |
| 8,073,664 B2 | 12/2011 | Schottle et al. |
| 8,094,515 B2 | 1/2012 | Miller et al. |
| 8,103,493 B2 | 1/2012 | Sagert et al. |
| 8,145,464 B2 | 3/2012 | Arnegaard et al. |
| 8,155,942 B2 | 4/2012 | Sarma et al. |
| 8,199,166 B2 | 6/2012 | Repin et al. |
| 8,249,844 B2 | 8/2012 | Dale et al. |
| 8,259,126 B2 | 9/2012 | Chuter |
| 8,280,635 B2 | 10/2012 | Ella et al. |
| 8,301,426 B2 | 10/2012 | Abasov et al. |
| 8,346,695 B2 | 1/2013 | Pepper et al. |
| 8,364,404 B2 | 1/2013 | Legendre et al. |
| 8,381,815 B2 | 2/2013 | Karanikas et al. |
| 8,392,163 B2 | 3/2013 | Liu |
| 8,427,904 B2 | 4/2013 | Miller et al. |
| 8,560,476 B2 | 10/2013 | Anderson et al. |
| 8,638,328 B2 | 1/2014 | Lin |
| 8,736,600 B2 | 5/2014 | Lin et al. |
| 8,751,208 B2 | 6/2014 | Brouwer et al. |
| 8,797,319 B2 | 8/2014 | Lin |
| 8,803,878 B2 | 8/2014 | Andersen et al. |
| 8,812,334 B2 | 8/2014 | Givens et al. |
| 8,849,639 B2 | 9/2014 | Brown et al. |
| 2002/0177955 A1 | 11/2002 | Jalali et al. |
| 2004/0012670 A1 | 1/2004 | Zhang |
| 2005/0119959 A1 | 6/2005 | Eder |
| 2005/0171700 A1 | 8/2005 | Dean |
| 2006/0224423 A1 | 10/2006 | Sun et al. |
| 2006/0247903 A1 | 11/2006 | Schottle |
| 2006/0265508 A1 | 11/2006 | Angel et al. |
| 2007/0198223 A1 * | 8/2007 | Ella et al. ............... 702/188 |
| 2007/0255500 A1 | 11/2007 | Pita et al. |
| 2007/0266082 A1 | 11/2007 | McConnell et al. |
| 2007/0276639 A1 | 11/2007 | Montaron et al. |
| 2008/0088621 A1 | 4/2008 | Grimaud et al. |
| 2008/0165185 A1 | 7/2008 | Smith et al. |
| 2008/0172272 A1 * | 7/2008 | Back et al. ............... 705/7 |
| 2008/0306803 A1 | 12/2008 | Vaal et al. |
| 2009/0027380 A1 | 1/2009 | Rajan et al. |
| 2009/0027385 A1 | 1/2009 | Smith |
| 2009/0037114 A1 | 2/2009 | Peng et al. |
| 2009/0089028 A1 * | 4/2009 | Sagert et al. ............... 703/6 |
| 2009/0125362 A1 | 5/2009 | Reid et al. |
| 2009/0132170 A1 | 5/2009 | Krueger et al. |
| 2009/0157367 A1 | 6/2009 | Meyer et al. |
| 2009/0182541 A1 | 7/2009 | Crick et al. |
| 2009/0222742 A1 | 9/2009 | Pelton et al. |
| 2009/0229819 A1 | 9/2009 | Repin et al. |
| 2009/0240564 A1 | 9/2009 | Boerries et al. |
| 2009/0295792 A1 | 12/2009 | Liu et al. |
| 2009/0299709 A1 | 12/2009 | Liu |
| 2010/0191516 A1 | 7/2010 | Benish et al. |
| 2010/0206559 A1 | 8/2010 | Sequeira, Jr. et al. |
| 2010/0283788 A1 | 11/2010 | Rothnemer et al. |
| 2011/0044532 A1 | 2/2011 | Holl et al. |
| 2011/0115787 A1 | 5/2011 | Kadlec |
| 2011/0153300 A1 | 6/2011 | Holl et al. |
| 2011/0161133 A1 | 6/2011 | Staveley et al. |
| 2012/0150449 A1 | 6/2012 | Dobin |
| 2012/0166166 A1 | 6/2012 | Czernuszenko |

OTHER PUBLICATIONS

Abdus Satter et al., "Integrated Reservoir Management," 1994, Journal of Petroleum Technology, vol. 46, No. 12, pp. 1057-1064.*

(56) References Cited

OTHER PUBLICATIONS

John N Ezekwe, "Comparison of predictions from reservoir models to actual production data: field examples," 2002, SPE Annual Technical Conference and Exhibition, pp. 1-14.*

John R. Fanchi, "Shared Earth Modeling," 2002, Gulf Professional Publishing, pp. 28-30, 83.*

Al-Asimi, M., et al. (2002), "Advances in Well and Reservoir Surveillance", Oilfield Review, pp. 14-35.

De Jonge, G.J., et al. (2002), "How Routine Reservoir Surveillance with Neural Networks and Simplified Reservoir Models can Convert Data into Information", SPE 78334, SPE 13$^{th}$ European Petroleum Conf., pp. 1-13.

De Jonge, G.J., et al. (2003), "Automated Reservoir Surveillance Through Data Mining Software", SPE 83974, Offshore Europe, pp. 1-6.

Mattax, C., et al. (1990), "Reservoir Simulation", SPE 20399, JPT, pp. 692-695, 1447-1448.

O'Connor, H., et al. (2002), "Real-Time Reservoir Management—A New Paradigm of Enhanced Productivity", Landmark Technical Review. Offshore, pp. 32-35.

Tavassoli, Z., et al. (2004), "Errors in History Matching", SPE 86883, SPE Journal, pp. 352-361.

Yamada, T., et al. (2000), "Non-Uniqueness of History Matching", SPE 59434, SPE Asia Pacific Conf.

European Search Report, dated Nov. 13, 2008.

International Search Report and Written Opinion, dated Dec. 16, 2008.

Bharat, K, et al. (2001), "Who Links To Whom: Mining Linkage Between Web sites", *Proceedings of the 2001 IEE Int'l Conf. on Data Mining*, pp. 51-58.

Cabral, B., et al (1995), "Accelerated Volume Rendering and Tomographic Reconstruction Using Texture Mapping Hardware", *IEEE in Symposium on Volume Visualization*, pp. 91-98, 131.

Crawfis, R., et al. (1992), "Direct Volume Visualization of Three-Dimensional Vector Fields", *Proceedings of the 1992 Workshop on Volume Visualization*, pp. 55-60.

Drebin, R., et al. (1988), "Volume Rendering", *Computer Graphics, the Proceedings of 1988 SIGGRAPH Conference*, vol. 22, No. 4, pp. 65-74.

Lorensen, W., el al., (1987), "Marching Cubes: A High-Resolution 3D Surface Construction Algorithm", *Computer Grphics, The Proceeding of 1987 SIGGRAPH Conference*, vol. 21, No. 4, pp. 163-169.

McCann, P., et al. (2003), "Horizontal Well Path Planning and Correction Using Optimization Techniques," *J. of Energy Resources Tech*. 123, pp. 187-193.

Mugerin. C., et al. (2002), "Well Design Optimization: Implementation in GOCAD," 22$^{nd}$ Gocade Meeting, Jun. 2002, pp. 1-14.

Rainaud, J.F., et al. (2004), "WOG—Well Optimization by Geosteering: A Pilot Software For Cooperative Modeling On Internet," *Oil & Gas Science & Tech*. 59(4), pp. 427-445.

Reed, P., et al. (2003) "Simplifying Multiobjective Optimization Using Genetic Algorithms," Proceedings of World Water and Environmental Resources Congress, 10 pgs.

Udoh, E., et al. (2003), "Applicatons of Strategic Optimization Techniques To Development and Management of Oil and Gas Resources", 27$^{th}$ SPE Meeting, 16 pgs.

\* cited by examiner

ITERATIVE RESERVOIR SURVEILLANCE

CROSS-REFERENCE TO RELATED APPLICATION

This application is the National Stage entry under 35 U.S.C. 371 of PCT/US2008/080513 that published as WO 2009/075946 and was filed on 20 Oct. 2008, which claims the benefit of U.S. Provisional Application No. 61/007,554, filed on 13 Dec. 2007, each of which is incorporated by reference, in its entirety, for all purposes.

FIELD OF THE INVENTION

The invention relates generally to the field of oil and gas production, and more particularly to reservoir management and surveillance. Specifically, the invention is a method for improving the ability of geoscientists and engineers to analyze and monitor the performance of a producing field or a planned producing field.

BACKGROUND OF THE INVENTION

Reservoir surveillance, as part of the reservoir management process, involves the continuous monitoring of production data across a spectrum of possible levels of investigation, ranging from full field to individual well. It entails the collection, integration and comprehensive analysis of geologic and engineering reservoir and well performance data to maximize economic recovery and optimize the rate of recovery at both the well and reservoir level.

To effectively monitor and manage production, data should be available real-time, with tools available to investigate the data at various time increments (hours, days, months, etc.). Effective surveillance includes the ability to compare actual vs. predicted production (performance forecast) and adjust the prediction through history matching or other methods to derive production forecasts. In addition, it is also useful to compare and contrast multiple data types at multiple time steps and at multiple levels of investigation. Using current technology, this is typically done with static charts, plots and maps. Only limited capabilities are available to spatially represent geologic and engineering production data in 3D space. Nor is there capability to interact with the 2D plots to animate the temporal component of the production data. This is particularly problematic for large fields, with many wells and a long production life. As a result, identifying anomalous well and reservoir performance is time and labor intensive.

Current reservoir surveillance practice entails plotting and analyzing various field and well performance indicators through a series of 2D plots, such as those generated in Excel. Data are imported and manipulated in spreadsheets and static 2D plots are generated to analyze performance. Although all of the data may be available to do an analysis, identifying root causes of production problems usually requires significant manipulation and parsing of the data and comparing multiple static plots.

The current practice of reservoir surveillance most often is done at separate scales during the life cycle of the field's production history. Integration of scales is difficult and for each scale analyzed, the geoscientist or engineer typically uses a different set of data for the analysis. Hence, the impact of issues that are identified at one scale may not be readily identified at other scales.

The reservoir simulation model data would be useful to include in the analysis, but often, the well based model data and especially the cell based model data can not be easily integrated into the analysis. Geologic model data, such as horizons, faults and other geologic data from the field are used sparsely if not ignored entirely.

Finally, dynamic representation of the 3D spatial component of the production data is not possible. Nor is the ability to animate the production data through time concurrently in 3D space and in 2D plots.

More details on current reservoir surveillance methods can be found in references such as:
Al-Asimi et al. "Advances in Well and Reservoir Surveillance," *Oilfield Review*, 14-35 (Winter 2002/2003);
O'Conner and Sherman, "Real-Time Reservoir Management—A New Paradigm for Enhanced Productivity," *Landmark Technical Review, Offshore*, 32-35 (September 2002);
de Jonge et al. "Automated Reservoir Surveillance Through Data Mining Software," *Society of Petroleum Engineers*, SPE 83974 (September 2003);
de Jonge and Stundner, "How Routine Reservoir Surveillance with Neural Networks and Simplified Reservoir Models can Convert Data into Information", *Society of Petroleum Engineers*, SPE 78334, (October 2002);
Z. Tavassoli et al. "Errors in History Matching," *SPE Journal*, 352-361 (September 2004);
Mattax and Dalton, "Reservoir Simulation," SPE Monograph #13, Richardson Texas: Society of Petroleum Engineers, Chapter 18—"History Matching" (1990); and
Yamada, "Non-uniqueness of history matching," Proc.—SPE Asia Pacific Conference (2000).

What is needed is a method for history updating of a simulation model that looks back to more fundamental models used to develop the simulator. The present method satisfies this need.

SUMMARY OF THE INVENTION

In one general aspect, a method for making production forecasts for a field containing one or more oil or gas reservoirs includes (a) developing a three-dimensional earth model of the field. (b) A geologic model of at least one reservoir is developed, based at least in part on the earth model, the geologic model being a cellular-based representation of at least one reservoir, each cell being assigned a value for a plurality of properties describing distribution of pore space, fluid types and amounts in place. (c) A reservoir simulator based at least in part on the geologic model is developed, said simulator being capable of predicting production rates. (d) Simulated historical production data is obtained from the reservoir simulator and (e) the simulated production data is compared with actual production data. (f) The earth model is adjusted to reduce any differences between simulated and actual data. Steps (b)-(f) are repeated using the adjusted earth model, adjusting the geologic model and simulator consistent with the adjustment to the earth model. (h) The adjusted earth model is used to make production forecasts for the field.

Implementations of this aspect may include one or more of the following features. For example, the method may include continuing to cycle through steps (b)-(f) until the differences between simulated and actual data are reduced to be within a pre-selected tolerance or another stopping point is reached. The 3D earth model may include data selected from one or more of the following types: (i) physical data such as well bore analyses; (ii) measured data such as well logs and seismic or electromagnetic survey data; (iii) interpretive data such as horizons and faults derived from measured data; (iv) estimates of rock properties. The cell properties may include one or more of net-to-gross ratio, facies types, porosity, permeability, and fluid saturation. The step of comparing the simulated production data with actual production data may include linking in a computer network the 3D earth model to a data base of actual production data and to production data predicted by the simulator; and displaying production data and animating in time-synchronized and interactive 2D and 3D plots to show actual vs. predicted production data.

The step of adjusting the earth model to reduce any differences between simulated and actual data may include displaying the 3D earth model in a computer-assisted visualization viewer; and concurrently displaying actual and predicted production data with the 3D earth model viewer, said displays being interactive such that adjustments to the earth model produce corresponding changes in predicted production data. The 2D production data plots may include at least one production data vs. time plot and at least one production data vs. depth plot. The step of developing a reservoir simulator may include obtaining and using 4D seismic or electromagnetic data pertaining to the reservoir. The step of developing a geologic model includes obtaining and using 4D seismic or electromagnetic data pertaining to the reservoir. The simulated and actual production data may include at least pressure data. The method may include using the adjusted simulator to predict production rates for future times.

In another general aspect, a method for producing hydrocarbons from a field containing one or more oil or gas reservoirs includes developing the field based at least in part on production forecasts determined by (a) developing a three-dimensional earth model of the field; (b) developing a geologic model of at least one reservoir, based at least in part on the earth model, said geologic model being a cellular-based representation of at least one reservoir, each cell being assigned a value for a plurality of properties describing distribution of pore space, fluid types and amounts in place; (c) developing a reservoir simulator based at least in part on the geologic model, said simulator being capable of predicting production rates; (d) obtaining simulated historical production data from the reservoir simulator; (e) comparing the simulated production data with actual production data; (f) adjusting the earth model to reduce any differences between simulated and actual data; (g) repeating steps (b)-(f) using the adjusted earth model, adjusting the geologic model and simulator consistent with the adjustment to the earth model; and (h) using the adjusted earth model to make production forecasts for the field.

BRIEF DESCRIPTION OF THE DRAWINGS

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION

The present invention is a method for reservoir surveillance in a three-dimensional Earth Model to improve and expedite reservoir surveillance at all scales of investigation (field, reservoir, fault compartment, and individual well) and at all time steps (minutes, hours, days, months, years). The new method allows users to rapidly identify anomalous field and well performance and provides capability to investigate root causes of the performance deviation from predicted. Tools to statistically analyze the degree of mismatch and adjust the input models are disclosed. Tools to iteratively adjust input model parameters and generate new predicted performance data to re-test against actual are also disclosed.

The method includes a 3D representation of an Earth Model of one or more producing reservoirs, i.e. a field. Typically, this will be a three-dimensional representation of the entire sub-surface area of interest, from the earth's surface to below the zone of interest, i.e. producing reservoir and surrounding area from the surface to a depth of the deepest well. An earth model is often intended to represent the most comprehensive understanding of the subsurface, incorporating all geologic data and concepts, each at their optimal scale, i.e. multiple scales. The model can include physical data—well bore analyses and facilities information (e.g., locations and layout of subsurface and surface hardware such as platforms, pipelines, templates, and wellheads); measured data—well logs, 2D/3D seismic; interpretative data—horizons or fault derived from wells and seismic; estimates of rock properties—temperature gradients, pore pressure predictions; and derivative data—geologic and simulation models derived from the interpretative data and engineering data such as facility and production data.

The invention allows for a dynamic retrieval of the production data and creation of time synchronous and interactive 2D and/or 3D representations of the data in a 3D Earth Model. The method, as described above, provides in some embodiments of the invention for concurrent data visualization, animation of time variant data, and ability to query multiple data types interactively and at multiple scales of investigation for the rapid identification of anomalous field and well performance.

In some embodiments, the present inventive method permits the production data to be accessible real-time and at various time increments (hours, days, months etc.) dependant upon the type of analysis. Production data may be actual (field production to data) or predicted (simulated model results) to allow for a comparison of actual vs. predicted in the analysis. The method will allow for comparing and analyzing actual to predicted production or multiple realizations of simulated production data if historical data are not yet available, e.g. pre-production development planning. Multiple realizations of simulated production data, however, could also be analyzed post-production to investigate multiple scenarios. The method uses tools, both graphical and statistical, to compare one production data set to another or multiple production data sets, with the ability to analyze the degree of similarity or dis-similarity between data sets.

The method is preferably implemented with tools that allow the user to quickly compare and contrast multiple data types (e.g. pressure, cumulative production, rates, etc.) at multiple time steps (e.g. days, months etc.) and at multiple levels of investigation (field, reservoir, compartment, individual well, etc.), for the purpose of improving the user's ability to monitor, predict, and manage a producing asset's performance. Filtering tools, (user defined, logical or spatial), will assist the user to quickly parse the data specific to the analysis.

The invention, as proposed, will allow for the rapid identification of anomalous field and well performance and provide the user the ability to investigate the root causes of performance deviation from predicted. The invention uses tools to both statistically analyze and visualize the degree of conformance of actual to predicted production data as well as tools to interactively adjust input model properties and re-run the process until and acceptable match is achieved. Utilization of the invention, process and method, allows the users to take appropriate, timely action to optimize the economic value of the producing resource.

The invention preferably uses a 3D graphical display system which allows for the visualization and rendering of the 3D Earth Model in 3D viewer and/or a 2D viewer.

Figure 1:
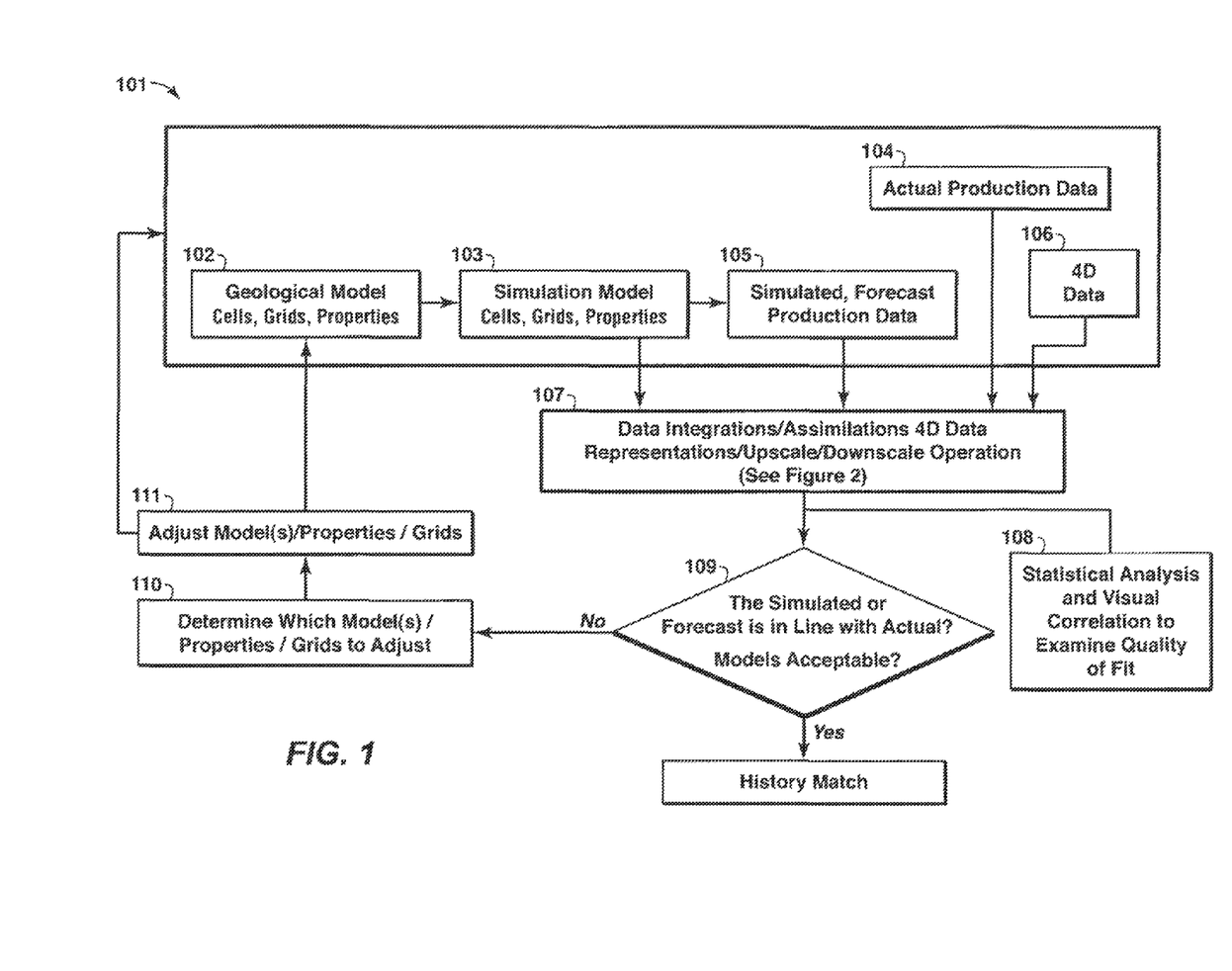
FIG. 1 is a flow chart showing basic steps in one embodiment of the present inventive method.

In one embodiment, the present inventive method comprises the following basic steps (see the flow chart of FIG. 1):

1) Create a three-dimensional representation of an Earth Model 101 of one or more potential reservoirs and their associated geologic data.

2) Populate the 3D Earth Model with well data such as well trajectories, well logs, completion, and perforation intervals. Most geoscience interpretation packages include the ability to co-render data types, but not all data types are compatible within a single application. Common commercial products include Petrel, gOcad, and IESX.

3) Obtain a geologic model 102 of the reservoir(s) with its associated static properties. A geologic model typically is a finely scaled cellular-based representation of a reservoir in the subsurface usually limited in extent to the immediate area of the reservoir. Cells within the model have properties such as net to gross, facies types, porosity, permeability, and saturation which describe the distribution of pore space, fluid types and amounts in place. The geologic model is created from interpretations of the data in the earth model, the interpretations being typically performed by a trained human interpreter. The interpretations are considered for terminology purposes herein to be part of the Earth Model.

4) Obtain a reservoir simulation model 103, and co-render the simulation model with its associated time independent and time dependant properties. Many oil companies have developed their own reservoir simulator, for example the ExxonMobil simulator called EMPower. Simulators may be purchased from vendors, for example Eclipse. The simulator will accept input information through which the user can tailor it to simulate flow behavior of a particular reservoir. This input information typically comes from one or more interpretations of the geologic model.

5) Link the 3D Earth Model to a production data base 104 and bring "real-time" production data into RAM memory.

6) Link the 3D Earth Model to simulated or forecast production data 105 produced by the simulator.

Figure 2:
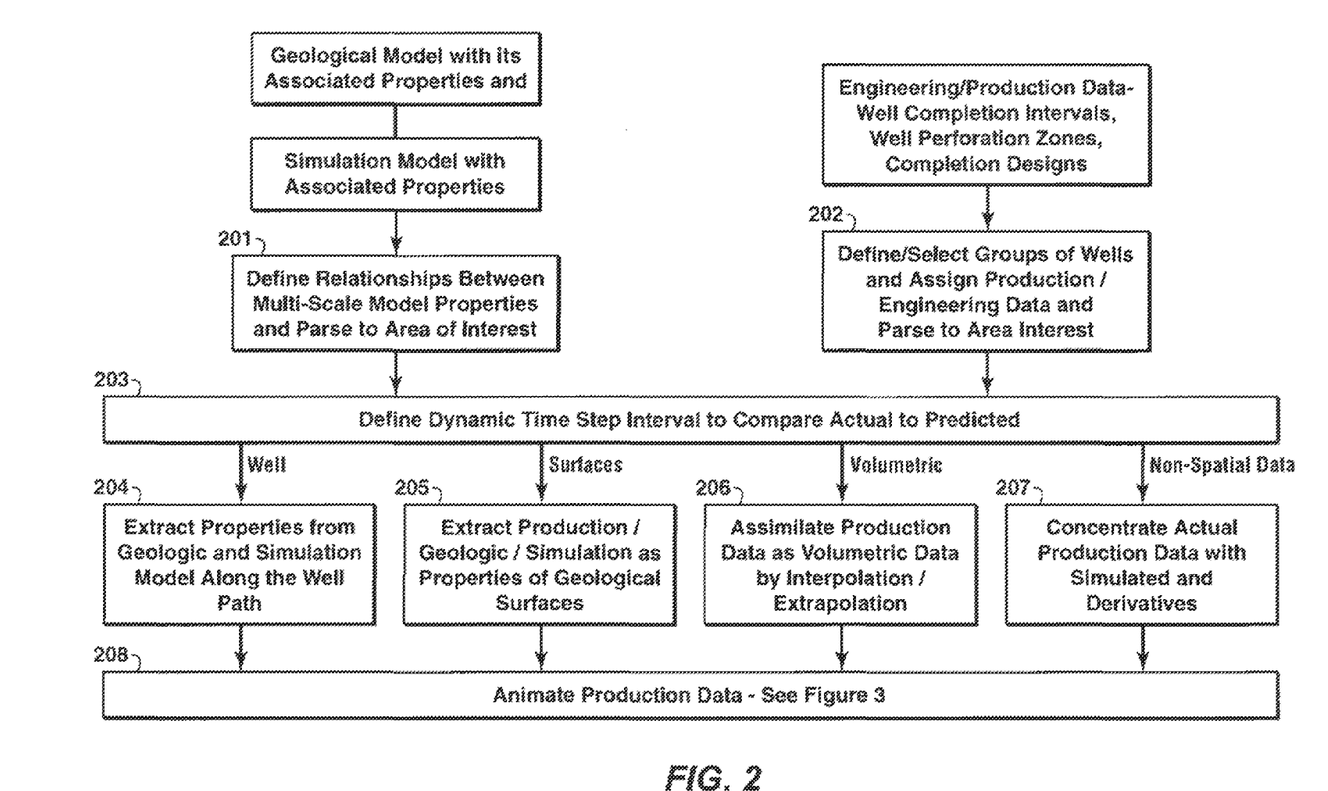
FIG. 2 is a flow chart that shows the steps in data integration and generation of analysis and animation components.

7) Co-render 4D time lapse data or other data denoting fluid movement if available (step 106). At step 107, data from steps 101-106 are integrated or assimilated, as further explained in the flow chart of FIG. 2:

8) Define groups of wells (for a field with many wells) using user-defined, spatial or logical filters to quickly parse the data specific to a particular selected analysis (step 202).

9) Define geometric and spatial relationships between multi-scaled cellular models and their properties at the original and unaltered model cell scales (step 201).

10) Define constant or variable time steps to compare actual production data to the modeled or forecast production data (step 203).

11) From the actual production data, geologic model and simulation model, extract time dependant or time independent properties along well bores. Derivative properties along the well bore may also be created from multiple extracted properties along the well bore. (Step 204)

12) From the production data, geologic model, or simulation model extract time dependant or time independent properties to drape, texture or grid to significant geologic surfaces. (Step 205)

13) Parse modeled volumetric time independent and time dependant production data to zone of interest and interpolate or extrapolate to conform to previously defined time steps (step 206).

14) Parse actual production data and derivatives to analyze at previously defined time step and concatenate actual and predicted production data (step 207).

Figure 3:
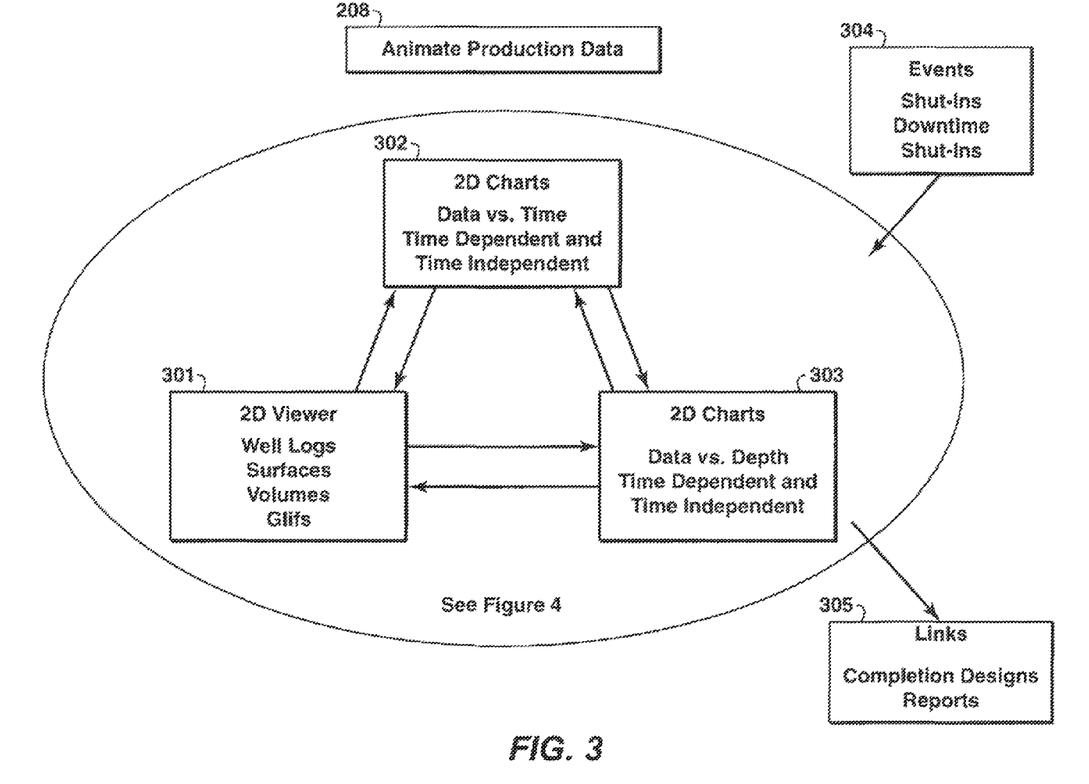
FIG. 3 is a flow chart that shows the animation steps.

15) Display all production data and animate in time-synchronized and interactive 2D and 3D plots and views to show actual vs. predicted performance (step 208). The flow chart of FIG. 3 represents potential 3D and 2D views of the invention and illustrates how production data are animated in one embodiment of the invention.

16) Animate time dependant production data in a 3D Viewer (a 3D window in which data from Steps 101-106 are displayed and manipulated) as 3D pies/histograms/or other glyphs (a glyph is a geometric data object representation that changes in appearance (size, orientation, shape, color, etc.) in response to changes in data input values concurrently with time dependant production data as gridded surfaces, volumetric cellular data, or well logs (step 301).

17) Animate concurrently with the 3D Viewer 2D charts of production data relative to time with the ability to post production data collected at discreet time intervals (step 302).

18) Animate concurrently with the 3D viewer 2D charts of production data relative to depth (step 303).

19) Animate production events, such as downtime, shut-ins, work-overs or other discreet or sporadic production data concurrently with other displays (step 304).

20) Link to well completion designs, well/field reports and other documents to facilitate analysis while animating production data (step 305).

21) Analyze degree of similarity of production data sets, actual vs predicted, using both statistical analysis methods and visual comparisons in 2D charts and 3D views. Statistical analysis could include algorithms to determine the degree of similarity between two or more production profiles. Visual comparison could include determining if flow or production behavior is conforming to interpreted behavior. (Step 108)

22) Determine if simulated production data matches actual (step 109).

23) If not start process to adjust 3D Earth Model and re-run:

24) If match is not satisfactory, determine root causes for production anomalies and identify what components of the 3D Earth Model including its inputs need to be updated (step 110). This may be aided by testing sensitivities of actual/predicted production data to particular changes to the Earth Model. Tools to display vertical, horizontal, arbitrary slices, model property filters, geographic filters, and model property statistics, analysis and charting may be provided to assist in determining root causes for production anomalies.

25) Adjust the 3D Earth model and component models, e.g. properties and surfaces in accordance with the previous step, and send updated properties to the geologic model or simulation model (step 111).

26) Generate new simulated production data, and repeat analysis until match at step 109 is acceptable.

The invention preferably utilizes a 3D representation of the producing field on a computer with visualization capabilities with the ability to link to a 2D plotting package, such as the commercial product gOcad. The computer system could be a single processor unit or preferably a networked multi-processor system. Data types to visualize in step 15 above could include one or more of the following, but not limited to:

1) Geologic data—well traverses, well logs, surfaces, faults, well tops;

2) Engineering data—well completion intervals, well perforation zones, completion designs;

3) The geologic model with associated properties such as horizons, porosity, horizontal permeability, vertical permeability, net to gross, facies, fluid saturations;

4) The simulation model and associated time independent properties such as horizons, porosity, horizontal permeability, vertical permeability, and time dependant properties such as fluid saturations, fluid rates, fluid ratios, fluid cumulatives, reservoir pressure, and well pressures;

5) A database containing historical field production data to visualize and animate; and 6) A database or databases containing simulated production data to render and animate.

The invention is time irrelevant; therefore, multiple time increment data (minutes, hours, days, months, years etc), can be investigated. Static production data captured at discreet discrete times, e.g. repeat formulation tester (RFT) or production logging tool (PLT) data etc. can be co-rendered with the animation of time varying production data. In practice, the data might typically be analyzed and visualized in linked 2D and 3D windows. Dependant on the data types, multiple 2D windows may be linked. Windows, both 2D and 3D, can be saved in their "present state" (displayed data, scales, annotation, etc.) to allow users to quickly incorporate new data as it becomes available or to quickly restart a saved work session.

Example

The following is an example of how the invention may be implemented, with some types of data displays shown. A three-dimensional representation of the subsurface is constructed, the 3D Earth Model, which represents the field of interest and surrounding area. Preferably, the 3D Earth Model is the most comprehensive sub-surface understanding of the field of interest and includes all data, at multiple scales of investigation that contributed to this understanding. The 3D Earth Model is designed to be the frame and context in which temporal data is to be displayed, animated and analyzed. As discussed above, FIG. 1 is a flow chart of a preferred embodiment of the Iterative Reservoir Surveillance process, i.e., the present inventive method; however the steps enumerated below in the description of the example refer to the more detailed 26-step embodiment of the invention discussed above. The 3D Earth Model representation could include one or more potential reservoirs and their associated geologic data and engineering data. The geologic data could include horizons, faults, seismic, and well trajectories. The engineering data could include pertinent well bore engineering data, e.g. well completion designs, completion interval, and perforation zone. (Steps 1-4) Actual production data, produced or injected volumes, rates, pressure, are integrated with the 3D Earth Model and production is assigned to individual wells, completions or perforation zones. (Step 5) Simulated production data, produced or injected volumes, rates, pressures, are also integrated with the 3D Earth Model and production is assigned to individual wells, completions or perforation zones. (Step 6) If available, 4D seismic or other data representing fluid movement from a 4D analysis could be integrated to compare simulated fluid movement to interpreted fluid movement from the 4D analysis. (Step 7)

To facilitate the analysis and animation, relationships between the production data, the cellular models (geologic model, simulation model), the volumetric data (3D/4D seismic), and wells are established. FIG. 2 shows the steps necessary in one embodiment of the invention to prepare the data, establish relationships between the various data types and subset or filter the data prior to animating and analyzing the production data. Data preparation includes assigning production data (rates, sums, pressure, etc) to the appropriate well, completion interval, or perforation zone. Production data is non-spatial, so in order to analyze such data in 3D space, the data needs to be assigned to a spatial object such as a well. Additional data preparation may include sub-setting the wells and production data (actual and simulated) and establishing groupings of wells to more effectively quarry the time variant production data relative to the 3D Earth Model during the analysis. (Step 8) Wells and production data can be further subset or grouped by the end user, for example by type (producer or injector), by geographic area, by reservoir, etc. using spatial and logical filters. Production data can also be subset through user-defined logical filters. To compare and analyze the production data with multiple models, the relationship between the cellular models and volumetric data needs to be defined both vertically (by interval or zone) and spatially (by compartment). This is necessary because the cellular models may have different geometries and cell sizes. (Step 9) The relationship between the cellular models and the volumetric data is then transposed to the well data, completion intervals or perforation zones and the previously assigned production data. Once these relationships are established, the analysis can quickly filter down to a specific group of wells, within a specific compartment and within a specific perforation interval, all within the context of the 3D Earth Model.

Since production data is time variant, time steps need to be defined to query and animate the production data. The time step increment can range from small (minutes) to large (years) and is set by the user and the type of analysis. The time step increment can also be variable depending upon the analysis and the time span of the data. (Step 10)

Once the relationship between models, wells and the non-spatial production data are established and the time increment for the analysis is defined, properties can be transferred from one object type to another object type. For instance, model properties (porosity, permeability, etc.) can be transferred from the intersection of the model with a well path to the well with the resultant property represented as a log. Model properties can be extracted specific to a zone or an interval and the resultant property can be represented as a sum or average of that zone or interval. The resultant extracted model property can then be transferred and displayed on a geologic surface. Model properties can also be transferred from one model to another model. Actual production can be concatenated with extracted simulated properties or their derivatives by zone, by completion, by perforation to animate and graph. (Steps 11, 12, 13, 14)

With all the data relevant to the analysis now related in the 3D Earth Model, it can be displayed in the 3D viewer and animated in time-synchronized, linked and interactive 2D and 3D views. (Step 15) FIG. 3 shows the linkages and interactivity of the 2D charts and 3D views in the animation process. Animation in the 3D viewer could consist of glyphs displaying production data (as rates, ratios, cumulatives, pie charts, balls, histograms, etc). Other properties could also be displayed on these glyphs as color to convey additional information. Also, in the 3D viewer co-rendered and synchronized with the glyphs, there could be additional time dependant production data displayed as gridded surfaces, e.g. pressure through time, extracted volumetric cellular data, e.g. fluid flow through time, or time dependant well log data, e.g. flow contribution within the perforation or completion interval through time. (Step 16)

Figure 4A:
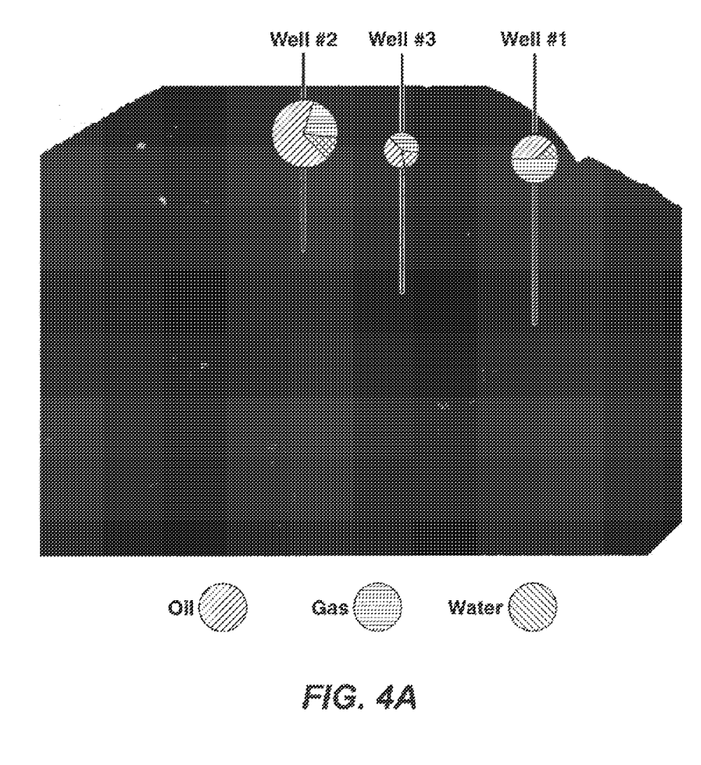
FIGS. 4A-4D depict a display that shows the interactive 2D data vs. time charts and the 3D view, with FIG. 4A being a representation of a color display, FIG. 4B being a production summary chart, FIG. 4C being a dynamic histogram, and FIG. 4D being an individual well production chart.
Figure 4B:
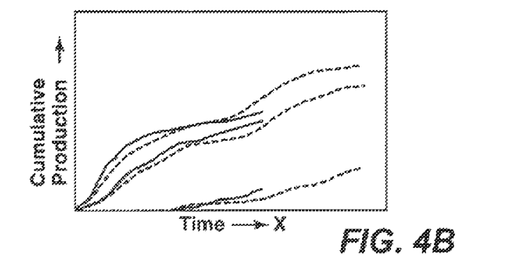
Figure 4C:
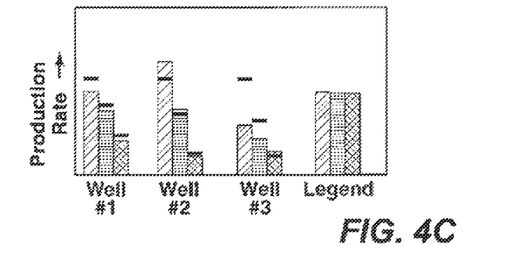
Figure 4D:
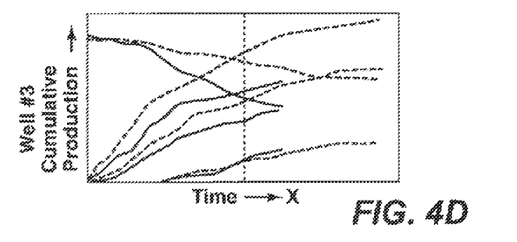

FIGS. 4A-D show the interplay of the two types (302 and 303) of 2D charts and the 3D viewer 301. This interplay provides the spatial context of the production data in the 3D Earth Model through the animation process. Typically, FIGS. 4A-D are co-rendered on the same display. FIG. 4A shows a single time instance of many for an animation of production data in the 3D Viewer represented as pie charts. The ratios of fluid types produced—oil, gas, water, are represented by the pies and will change through the animation, although any ratio of production attributes can be represented. The size of the pies are scaled to a production attribute such as cumulative oil produced. Also textured on to a surface is pressure represented by a gridded set of points that will also change during the animation (darker shading represents higher pressure). FIG. 4A is a black and white version of a color display, where color represents pressure. The 3D viewer is interactive with all the 2D charts (FIGS. 4B, 4C, 4D, and 5). As mentioned above, there are two types of 2D charts, 1) data vs. time and 2) data vs. depth. FIGS. 4B, 4C and 4D show three sub sets of the data vs. time 2D charts: FIG. 4B is a production summary chart and shows cumulative oil, gas and water produced for the entire field. It also shows the expected or predicted cumulative produced volumes for the field from the simulation model. Actual production data is represented as solid lines while simulated production data is represented as dashed lines. Time is increasing to the right along the horizontal axis while cumulative production is increasing upward along the vertical axis. Time X represents a single time instance. FIG. 4C is a dynamic histogram representing production at a single point in time, e.g. time X. It shows which wells are contributing at that particular time and allows the user to quickly compare the relative contribution of relevant wells. The example in FIG. 4C shows a comparison of production rate (oil, gas, water) from three individual wells, represented as histogram bars, and also compares the expected individual well production rates from the simulation model. Simulated rates are represented as horizontal lines above or below the histogram bars. Three individual wells are represented along the horizontal axis while rate is displayed increasing upward along the vertical axis. FIG. 4C shows that well #3 has a lower oil rate than predicted at time X. FIG. 4D is an individual well production chart through time. (Step 17) It shows Well #3's cumulative production volumes and pressures through time as compared to the simulation model. Actual pressure and actual production data for oil, gas and water are represented as solid lines while simulated pressure and production data are represented as dashed lines. Time is increasing to the right along the horizontal axis while cumulative production and pressure (BHP) increase upward along the vertical axis. Time X represents the current time instance. FIG. 4D shows that Well #3's cumulative oil and as production, and pressure (BHP) are below predicted.

Figure 5:
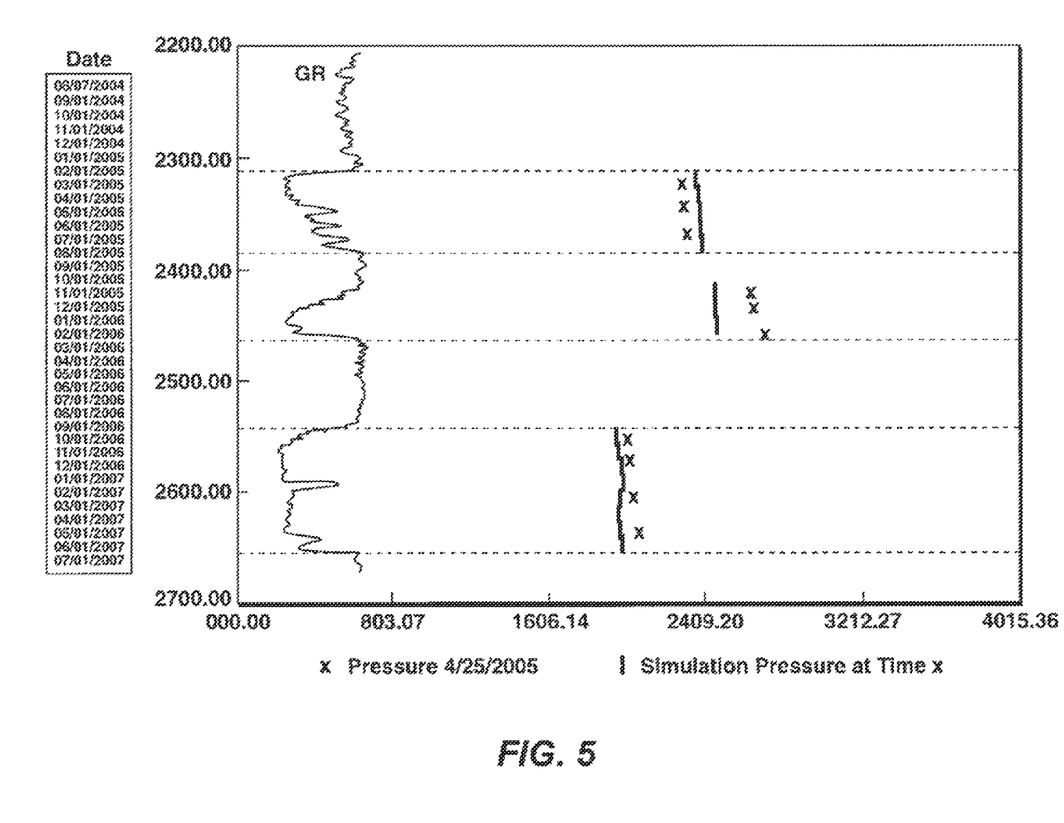
FIG. 5 is a display that shows the interactive 2D data vs. depth chart.

FIG. 5 shows a second type of 2D chart. These data vary not only temporally but also with depth along the well trajectory. Examples of this type of data include flow contribution, phase, pressure, rate etc. (Step 18) All 2D charts and 3D views preferably will have the capability to not only display time variant data but also discrete or sporadic data at their time of occurrence, for example, fluid test data, downtime, etc. (Step 19) In addition, there may be ability to link to other data types, such as well completion designs, well reports or other documents to facilitate the analysis. (Step 20) Two types of pressure data are shown in FIG. 5, a reservoir pressure measured in a well test at time X and a simulated pressure. In addition, a gamma ray (GR) data vs. depth 2D chart is the typical well log display but with the ability to display and animate time variant dynamic production data, such as pressure given in the example. The gamma ray curve is used in this case to distinguish reservoir rock from non-reservoir rock. Pressure increases to the right along the horizontal axis while depth increases downward along the vertical axis. For each pressure point taken in the well, in this example on Apr. 25, 2005, the measured pressure is represented by a discrete pressure value and depth, denoted by the symbol X in the drawing. The dynamic pressure data, the simulated pressure derived from the simulation model, is represented by a vertical bar the height of which represents the vertical cell size of the simulation model. By animating the simulation pressures, the analyst can determine how well simulated data matches actual data for a coincident date. All 2D and 3D charts from FIG. 5 and FIGS. 4 A-D are interactively linked to animate concurrently.

The linked 2D charts and 3D views provide for the ability to quickly review production and field history and identify anomalies and deviations from expected in a spatial context as well as to quickly query down to a specific well or group of wells that are performing anomalously. In addition to the visual analysis and comparison capabilities, additional functionality may be provided with algorithms to statistically analyze the degree of data similarity or non-similarity. These types of analysis will facilitate assisted history matching, model scale up/model scale down quality control (QC), and property model adjustments. Examples include analyzing the production profiles (actual and simulated) of a group of wells to determine which well's profiles are statistically alike, or comparing properties from different models (values and spatial orientation) to determine degree of similarity between two models. (Step 21)

Throughout the analysis, if it is determined that the simulated production data is not statistically comparable or is incorrect with the actual production data or the original input models are incorrect, then the 3D Earth Model will need to be updated and the process re-run. (Steps 22, 23) Techniques for determining which model properties to adjust may be found in references such as Tavassoli et al., Mattox et. al, and Boberg et. al. which discuss history matching techniques. (Step 24) The invention facilitates adjusting model properties and grids interactively. Model cells that need to be adjusted can be selected through a threshold filter or other methods. Properties associated with these cells can be passed to other models and derivative properties can be generated. Grids can also be adjusted and the properties associated with the cells bounding these surfaces can be adjusted as well. (Step 25) Once the grid and cell properties are selected and adjusted, these can be passed to the geologic model as shown in FIG. 1. Due to the changes to the geologic model, a new simulation model will be generated as well as new simulated production data. Adjusted properties can also be passed directly to the simulation model if the adjustments are deemed minor prior to generating new simulated production data. (Step 26) This process will be repeated until an acceptable match is achieved, i.e. actual vs. predicted production are statistically similar. (Step 27)

In the example given in FIGS. 4A-D and 5, the ability to animate sporadic and dynamic production data in interactive and linked 2D and 3D charts allows the user to identify if production performance is deviating from expected and provide the tools to quickly determine where, when and why the deviations occurred. For instance, it may be noted in FIG. 4B that the field, cumulative performance was not performing as expected. From FIG. 4C, the user can identify which well or wells are contributing to the problem: the production in well #3 is half of what was expected. Examining well #3's individual production data, the user can determine if other data are anomalous (FIG. 4D). In this case, in addition to cumulative production, reservoir pressure is also dropping suggesting that the well is not in communication with other wells in the field. The interactive 3D viewer, FIG. 4A, allows the user to compare the spatial relationship of the anomalous well to nearby wells to ascertain if the problem is limited to the individual well or affects a larger area.

Figure 6:
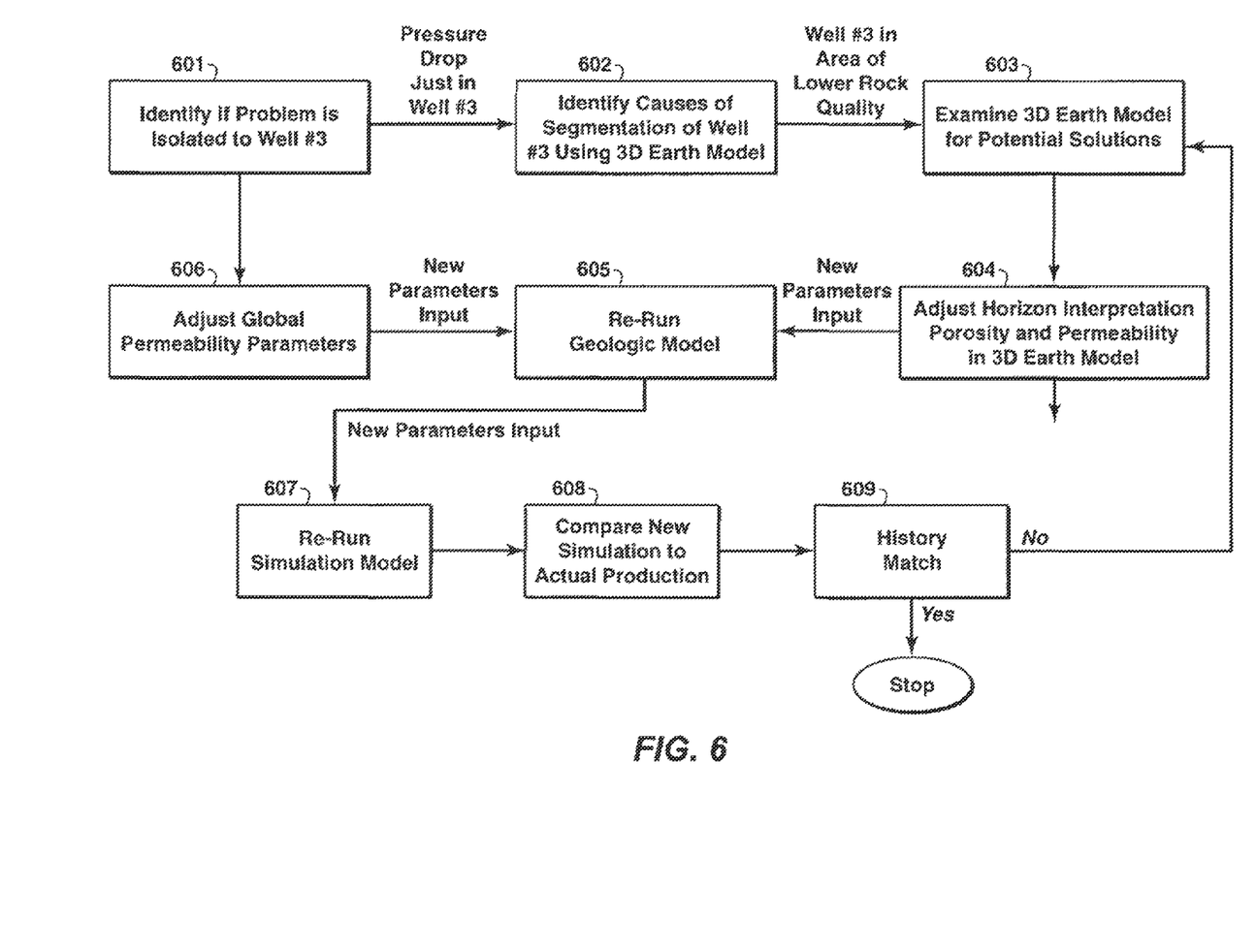
FIG. 6 is a flow chart that illustrates a specific reservoir surveillance use example described in the application.

FIG. 6 is a flow diagram to illustrate one specific use case. In this example well #3 is located in a pressure low (see FIG. 4A), which appears isolated from the other wells. The first step, 601, is to identify if the problem is isolated to Well #3 or is field wide. If the pressure drop is field wide then adjusting permeability globally, step 606, may be acceptable. A global update of the geologic model and a re-run the simulation may be sufficient to test a new realization. For this particular example, however, it will be assumed that the pressure drop is limited to Well #3. In step 602, the 3D Earth Model and its associated data are used to identify potential causes of the segmentation of Well #3 from the rest of the field. Visual and analytical tools, such as slicing and filtering, within the invention allow the identification of an area of lower rock quality in the vicinity of Well #3. Once causes for the anomalous well are identified, the user can query the 3D Earth Model to identify possible corrections, step 603. Using the 3D Earth model and the visual and analytical tools, it is determined that the reservoir interval was originally interpreted too thick and needs to thin. In addition, porosity and permeability in the area around Well #3 needs to be adjusted downward. Since the 3D Earth Model has all the pertinent data, the analyst has all the information necessary to make comprehensive adjustments. In step 604 the grids of the 3D Earth Model are adjusted interactively in the 3D viewer in the area around Well #3. Through the interrogation of the 3D Earth Model, the area to limit the downward adjustments to the permeability and porosity functions are also determined. The new grids, permeability, and porosity functions are sent to re-run the geologic model, step 605. The updated geologic model is then used to update the simulation model to re-run the simulated production, step 607. The re-run simulated production can be compared to the actual production data, step 608, to determine if there is an acceptable match, step 609. If the match is still not acceptable then the Earth Model can be re-examined for potential solutions to iterate again, steps 603 through 609. If independent fluid movement data is available, such as 4D seismic, it can be integrated into the analysis at any step, 601 through 609.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A method for making production forecasts for a field containing one or more oil or gas reservoirs, comprising:
   (a) developing a three-dimensional (3D) earth model of the field, wherein the 3D earth model comprises interpretive data, the interpretive data including horizons and faults derived from measured data;
   (b) developing a geologic model of at least one reservoir, based at least in part on the earth model, said geologic model being a cellular-based representation of at least one reservoir, each cell being assigned a value for a plurality of properties describing distribution of pore space, fluid types and fluid amounts in place;
   (c) developing a reservoir simulator based at least in part on the geologic model, said simulator configured to predict production rates;
   (d) obtaining simulated historical production data from the reservoir simulator;
   (e) comparing the simulated production data with actual production data, wherein the comparing comprises
       temporally linking, in a computer network, the 3D earth model to a database of the actual production data and to the simulated production data predicted by the simulator, and
       simultaneously displaying plural images that compare the actual production data to the simulated production data predicted by the simulator,
       wherein the plural images are animated while being synchronized in time according to the temporally linking of the 3D earth model to the database of the actual production data and to the simulated production data predicted by the simulator;
   (f) adjusting at least some of the interpretative data in the earth model to reduce a difference between the simulated production data and the actual production data, wherein the adjusting the at least some of the interpretative data in the earth model results in automatically adjusting the geologic model and automatically adjusting the reservoir simulator;
   (g) obtaining updated simulated historical production data based on the adjusted earth model, the automatically adjusted geologic model and the automatically adjusted reservoir simulator; and
   (h) using the adjusted earth model to make production forecasts for the field.

2. The method of claim 1, further comprising continuing to cycle through steps (b)-(f) until the differences between simulated and actual data are reduced to be within a pre-selected tolerance or another stopping point is reached.

3. The method of claim 1, wherein the 3D earth model further comprises data selected from one or more of the following types: (i) physical data, including well bore analyses; (ii) measured data, including well logs and seismic or electromagnetic survey data; (iii) estimates of rock properties.

4. The method of claim 1, wherein the cell properties comprise one or more of net-to-gross ratio, facies types, porosity, permeability, and fluid saturation.

5. The method of claim 1, wherein the step of adjusting the at least some of the interpretative data in the earth model to reduce the difference between simulated and actual data comprises:

displaying the 3D earth model in a computer-assisted visualization viewer; and concurrently displaying actual and predicted production data with the 3D earth model viewer, said displays being interactive such that adjustments to the earth model produce corresponding changes in the displayed predicted production data.

6. The method of claim 1, wherein the plural images comprise 2D or 3D production data plots, with at least one production data vs. time plot and at least one production data vs. depth plot.

7. The method of claim 1, wherein the step of developing a reservoir simulator includes obtaining and using four-dimensional (4D) seismic or electromagnetic data pertaining to the reservoir.

8. The method of claim 1, wherein the step of developing a geologic model includes obtaining and using four-dimensional (4D) seismic or electromagnetic data pertaining to the reservoir.

9. The method of claim 1, wherein the simulated and actual production data include at least pressure data.

10. The method of claim 1, further comprising using the adjusted simulator to predict production rates for future times.

11. The method of claim 1, wherein the plural images include a first animated image that depicts changes in ratios of oil, gas, and water over time, a second animated image that depicts changes in cumulative oil, gas, and water produced for the field over time, a third animated image that depicts changes in production rate for a plurality of wells over time, a fourth animated image that depicts changes in well production over time, the first animated image, the second animated image, the third animated image, and the fourth animated image include at least one of the actual production data, the simulated production data, or a difference between the actual production data and the simulated production data, and animation of the first animated image, the second animated image, the third animated image, and the fourth animated image are synchronized in time according to the temporal linking of the 3D earth model to the database of the actual production data and to the simulated production data predicted by the simulator.

12. A method comprising:

(a) obtaining a three-dimensional (3D) earth model of the field, wherein the three-dimensional earth model comprises interpretive data, the interpretative data including horizons and faults derived from measured data;

(b) obtaining a geologic model of at least one reservoir, based at least in part on the earth model, said geologic model being a cellular-based representation of at least one reservoir, each cell being assigned a value for a plurality of properties describing distribution of pore space, fluid types and fluid amounts in place;

(c) obtaining a reservoir simulator based at least in part on the geologic model, said simulator configured to predict production rates;

(d) obtaining simulated historical production data from the reservoir simulator;

(e) comparing the simulated production data with actual production data, wherein the comparing comprises temporally linking, in a computer network, the 3D earth model to a database of the actual production data and to the simulated production data predicted by the simulator, and simultaneously displaying plural images that compare the actual production data to the simulated production data predicted by the simulator, wherein the plural images are animated while being synchronized in time according to the temporally linking of the 3D earth model to the database of the actual production data and to the simulated production data predicted by the simulator;

(f) adjusting at least some of the interpretative data in the earth model to reduce a difference between the simulated production data and the actual production data, wherein the adjusting the at least some of the interpretative data in the earth model results in automatically adjusting the geologic model and automatically adjusting the reservoir simulator; and (g) obtaining updated simulated historical production data based on the adjusted earth model, the automatically adjusted geologic model and the automatically adjusted reservoir simulator.

13. The method of claim 12, wherein the plural images include a first animated image that depicts changes in ratios of oil, gas, and water over time, a second animated image that depicts changes in cumulative oil, gas, and water produced for the field over time, a third animated image that depicts changes in production rate for a plurality of wells over time, a fourth animated image that depicts changes in well production over time, the first animated image, the second animated image, the third animated image, and the fourth animated image include at least one of the actual production data, the simulated production data, or a difference between the actual production data and the simulated production data, and animation of the first animated image, the second animated image, the third animated image, and the fourth animated image are synchronized in time according to the temporal linking of the 3D earth model to the database of the actual production data and to the simulated production data predicted by the simulator.

14. The method of claim 12, further comprising:

(h) using the adjusted earth model to make production forecasts for the field; and (i) developing the field based at least in part on the production forecasts.

15. An apparatus comprising:

a non-transitory computer readable storage medium, which is encoded with executable instructions; and a computer processor device that is configured to obtain a three-dimensional (3D) earth model of a field, wherein the 3D earth model comprises interpretive data, the interpretive data including horizons and faults derived from measured data, obtain a geologic model of at least one reservoir, based at least in part on the earth model, said geologic model being a cellular-based representation of at least one reservoir, each cell being assigned a value for a plurality of properties describing distribution of pore space, fluid types and fluid amounts in place, obtain simulated historical production data from a reservoir simulator, compare the simulated production data with actual production data, by utilizing a temporal link, in a computer network, between the 3D earth model, a database of the actual production data and the simulated production data predicted by the simulator and by simultaneously outputting a display comprising plural images that compare the actual production data to the simulated production data predicted by the simulator, wherein the plural images are animated while being synchronized in time according to the temporal link between the 3D earth model, the database of the actual production data and the simulated production data predicted by the simulator, adjust at least some of the interpretative data in the earth model to reduce a difference between the simulated production data and the actual production data, wherein an adjustment to the at least some of the interpretative data in the earth model results in an automatic adjustment to the geologic model and an automatic adjustment to the reservoir simulator, and obtain updated simulated historical production data based on the adjusted earth model, the automatically adjusted geologic model and the automatically adjusted reservoir simulator.

16. The apparatus of claim 15, wherein the plural images include a first animated image that depicts changes in ratios of oil, gas, and water over time, a second animated image that depicts changes in cumulative oil, gas, and water produced for the field over time, a third animated image that depicts changes in production rate for a plurality of wells over time, a fourth animated image that depicts changes in well production over time, the first animated image, the second animated image, the third animated image, and the fourth animated image display at least one of the actual production data, the simulated production data, or a difference between the actual production data and the simulated production data, and animation of the first animated image, the second animated image, the third animated image, and the fourth animated image are synchronized in time according to the temporally link between the 3D earth model, the database of the actual production data and the simulated production data predicted by the simulator.

* * * * *